(12) United States Patent
Rajan et al.

(10) Patent No.: US 7,996,406 B1
(45) Date of Patent: Aug. 9, 2011

(54) METHOD AND APPARATUS FOR DETECTING WEB-BASED ELECTRONIC MAIL IN NETWORK TRAFFIC

(75) Inventors: Basant Rajan, Pune (IN); Chirag Deepak Dalal, Mumbai (IN); Navin Kabra, Pune (IN)

(73) Assignee: Symantec Corporation, Mountain View, CA (US)

( * ) Notice: Subject to any disclaimer, the term of this patent is extended or adjusted under 35 U.S.C. 154(b) by 387 days.

(21) Appl. No.: 12/241,363

(22) Filed: Sep. 30, 2008

(51) Int. Cl.
   *G06F 17/30* (2006.01)
(52) U.S. Cl. .................................. 707/739; 707/754
(58) Field of Classification Search .............. 707/754; 709/206
   See application file for complete search history.

(56) References Cited

U.S. PATENT DOCUMENTS

| | | | | |
|---|---|---|---|---|
| 7,631,046 | B2 * | 12/2009 | Litvin et al. | 709/206 |
| 2004/0225645 | A1 * | 11/2004 | Rowney et al. | 707/3 |
| 2007/0271372 | A1 * | 11/2007 | Deninger et al. | 709/224 |

OTHER PUBLICATIONS

Pukkawanna et al., Classification of web-based email traffic in Thailand, Communications and Information Technologies, 2006. ISCIT '06. International Symposium on, 2006.*
Code Green Networks, Solution Guide, 2007.*
GTB Technologies, The Information Leak Detection & Prevention Guide, Apr. 2007.*

* cited by examiner

*Primary Examiner* — James Trujillo
*Assistant Examiner* — William Spieler
(74) *Attorney, Agent, or Firm* — Hunton & Williams, LLP

(57) ABSTRACT

Method and apparatus for detecting web-based electronic mail in network traffic is described. In some examples, web pages are extracted from the network traffic. Fields in each page of a group of the web pages that share a documents structure are identified. A statistical analysis of the fields of each page in the group of web pages is performed to identify any electronic mail (e-mail) fields. The group of web pages is indicated to include web-based e-mail messages if the fields of each page in the group of web pages include at least one e-mail field.

14 Claims, 6 Drawing Sheets

500

```
<table class="messageheader" border="0"
cellpadding="0" cellspacing="0"
width="100%">
<tbody><tr><td class="label"
nowrap="nowrap">subject:</td><td> The
sale ad </td></tr>
<tr><td class="label"
nowrap="nowrap">Date:</td><td> Tue, 24
Jan 2006 10:46:54 +0530 </td></tr>
<tr><td class="label"
nowrap="nowrap">From:</td><td> "atulg"
<atulg@infosys.com&qt;    
```

FIG. 5

METHOD AND APPARATUS FOR DETECTING WEB-BASED ELECTRONIC MAIL IN NETWORK TRAFFIC

BACKGROUND OF THE INVENTION

1. Field of the Invention

The present invention relates generally to computer network traffic analysis. More particularly, the present invention relates to a method and apparatus for detecting web-based electronic mail in network traffic.

2. Description of the Related Art

Various software applications exist to intercept electronic mail (e-mail) within a network. An enterprise, small business, or other organization may utilize such applications for purposes of compliance checking, data leakage prevention (DLP), archiving, and the like. Such applications can be effective at intercepting normal e-mail messages composed and sent using e-mail client applications, such as MICROSOFT OUTLOOK and the like. Such normal e-mail messages can be detected, since the e-mail client applications utilize well-known e-mail protocols, such as simple mail transfer protocol (SMTP). E-mail intercept applications, however, fail to capture web-based e-mail messages (also referred to as "webmail"). Exemplary webmail clients include HOTMAIL, GMAIL, YAHOO mail, and the like. Applications that monitor the well-known e-mail protocols can miss webmail messages, which are typically sent out of the network using hypertext transfer protocol (HTTP).

Accordingly, there exists a need in the art for a method and apparatus for detecting web-based e-mail in network traffic.

SUMMARY OF THE INVENTION

Aspects of the invention relate to a method, apparatus, and computer readable medium for processing network traffic. In some embodiments, web pages are extracted from the network traffic. Fields in each page of a group of the web pages that share a document structure are identified. A statistical analysis of the fields of each page in the group of web pages is performed to identify any electronic mail (e-mail) fields. The group of web pages is indicated to include web-based e-mail messages if the fields of each page in the group of web pages include at least one e-mail field.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 depicts an exemplary snippet of HTML code according to some embodiments of the invention.

DETAILED DESCRIPTION

Figure 1:
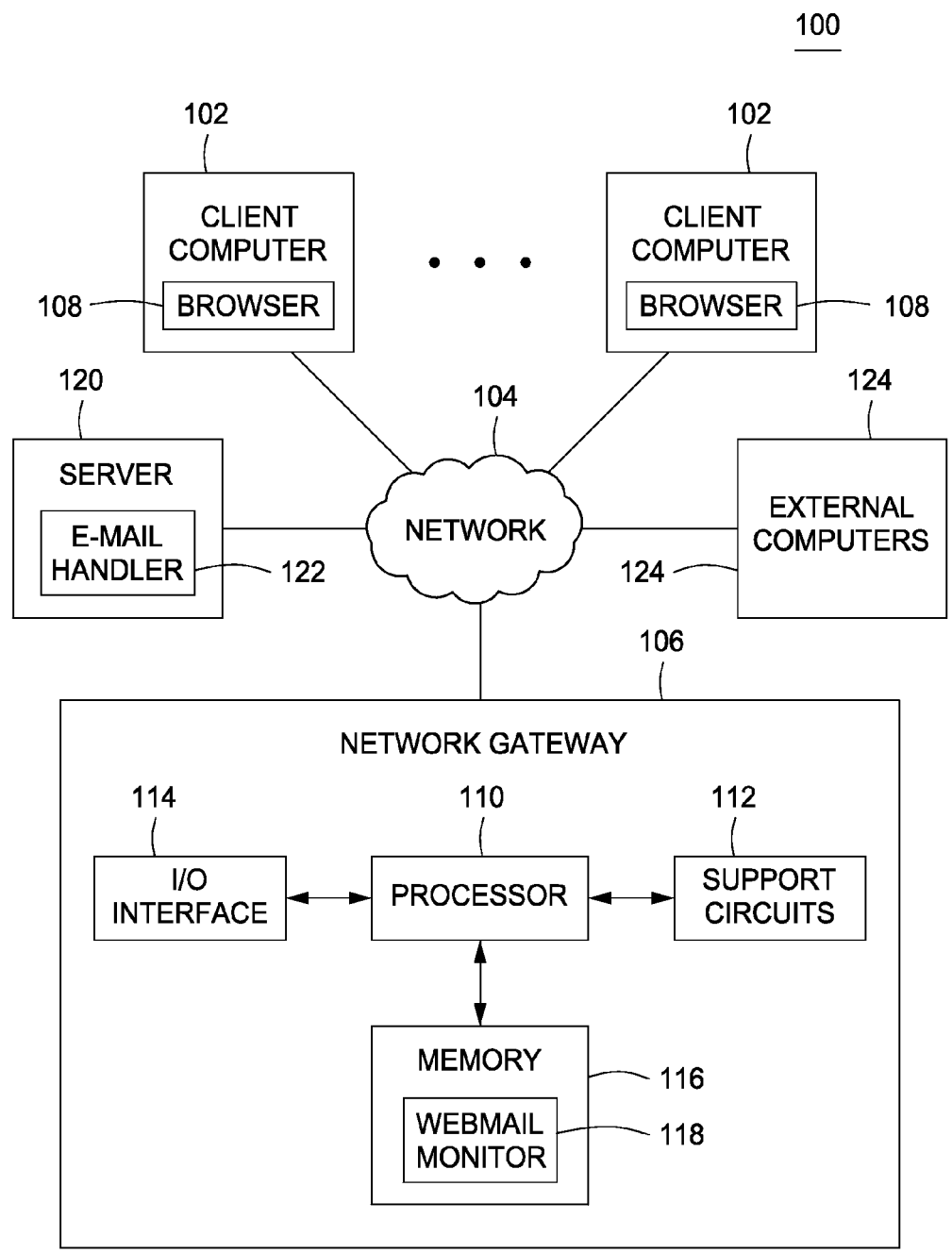
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The system 100 includes client computers 102, a network 104, and a network gateway 106. The network 104 comprises a communication system that connects computer systems by wire, cable, fiber optic, and/or wireless links facilitated by various types of well-known network elements, such as hubs, switches, routers, and the like. In particular, the network 104 connects the client computers 102 and the gateway 106, as well as other external computers 124 (e.g., web servers on the Internet). The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN).

Each of the client computers 102 includes a browser 108. The client computers 102 may comprise any type of computing devices capable of implementing the browser 108. The browser 108 may comprise software executable by each of the client computers 102 to browse the World Wide Web (WWW) (the browser may also be referred to as an "Internet Browser"). Exemplary browsers include MICROSOFT INTERNET EXPLORER, MOZILLA FIREFOX, and APPLE SAFARI. The browser 108 is configured to communicate with various web servers (e.g., external computers 124) using various application protocols, such as hypertext transfer protocol (HTTP), secure HTTP (HTTPS), and the like. Notably, the browser 108 may be employed to send and receive web-based electronic mail (e-mail), commonly referred to as "webmail." A user may interact with various web pages via the browser 108 to send and receive webmail. The web pages are transferred over the network 104 between the client computers 102 and web servers (e.g., external computers 124) in the network traffic. Web pages may include hypertext markup language (HTML), extensible markup language (XML), JAVASCRIPT, JAVASCRIPT Object Notation (JSON), asynchronous JAVASCRIPT and XML (AJAX), or the like, as well as combinations of such formats.

The network gateway 106 is configured to implement a webmail monitor service 118. The network gateway 106 illustratively includes a processor 110, a memory 116, various support circuits 112, an I/O interface 114. The processor 110 may include one or more microprocessors known in the art. The support circuits 112 for the processor 110 include conventional cache, power supplies, clock circuits, data registers, I/O interfaces, and the like. The I/O interface 114 may be configured for communication with the network 104. The memory 116 may include one or more of the following random access memory, read only memory, magneto-resistive read/write memory, optical read/write memory, cache memory, magnetic read/write memory, and the like.

In some embodiments, the webmail monitor service 118 comprises software configured for execution by the processor 110 to cause the network gateway 106 to process webmail messages sent by the client computers 102. While the webmail monitor service 118 is described as being software executed by the processor 110, it is to be understood that the webmail monitor service 118 may be implemented using hardware (e.g., via an application specific integrated circuit (ASIC) or programmable logic device (PLD), or a combination of hardware and software within the network gateway 106.

Figure 2:
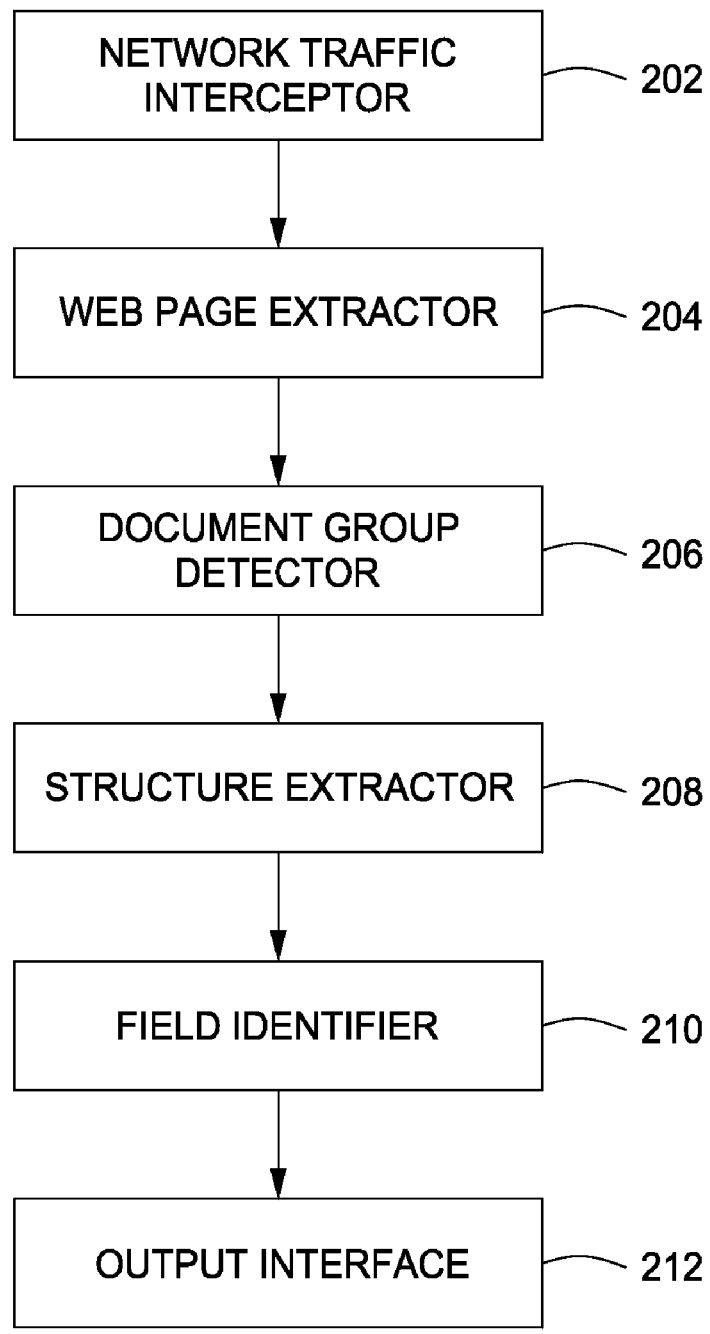
FIG. 2 is a block diagram depicting a webmail monitor service according to some embodiments of the invention.

FIG. 2 is a block diagram depicting the webmail monitor service 118 according to some embodiments of the invention. The webmail monitory service 118 includes an network traffic interceptor 202, a web page extractor 204, a document group detector 206, a structure extractor 208, a field identifier 210, and an output interface 212. The network traffic interceptor 202 is configured to intercept network traffic traversing the network 104 to and from the client computers 102 that could include webmail messages (e.g., HTTP, HTTPS, and the like). The web page extractor 204 is configured to extract web pages from the network traffic. The web pages are provided to the document group detector 206.

The document group detector 206 is configured to execute a document group detection algorithm to detect groups of web pages that share document structure. That is, various web pages may include a similar document structure (e.g., template) that can be detected. Web pages sharing a similar or same document structure form a group. In some embodiments, the document group detection algorithm may include a document clustering algorithm that uses the web pages as parametric input to produce the groups of web pages. Various document clustering algorithms are known in the art. The document group detector 206 provides the groups of web pages to the structure extractor 208.

The structure extractor 208 is configured to execute a structure extraction algorithm to identify fields in each page in a group of web pages. A field is a structural element in a web page that can include variable text. Thus, a particular field likely includes different text from one page to another in a group of web pages. In some embodiments, the structure extractor 208 identifies structural portions of pages in a group of web pages. The structure extractor 208 then determines at least one common structural portion of the structural portions as being shared across all pages in the group of web pages. That is, the common structural portion(s) comprise the shared document structure of the group of web pages. The remaining portions of the identified structural portions are the fields. The common structural portion(s) typically do not include useful data and can be ignored. The structure extractor 208 performs this process for each group of web pages and provides field information to the field identifier 210.

The field identifier 210 is configured to perform a statistical analysis of the fields of each page in a group of web pages to identify any e-mail fields. For example, the field identifier 210 can attempt to determine if the fields include a "TO" field, a "FROM" field, a "CC" field, a "SUBJECT" field, a "BODY" field, an "ATTACHMENT" field, or like type e-mail fields known in the art. The field identifier 210 can analyze each of the fields across all of the pages in a group of web pages against at least one statistical requirement. In some embodiments, the field identifier 210 can analyze one or more of the fields across all of the pages in a group of web pages against at least one regular expression requirement (e.g., a mechanism for identifying particular strings of text). The field identifier 210 may identify a group of web pages to include webmail messages if the fields of each page include at least one e-mail field. Otherwise, the field identifier 210 may indicate the group of web pages as not having webmail messages. The field identifier 210 performs the above described process for each group of web pages and provides results of the field analysis to the output interface 212.

The output interface 212 can provide the field information for further analysis. In some embodiments, the output interface 212 can extract text content from the fields of each page in a group of web pages indicated as include webmail messages. Referring to FIG. 1, the output interface 212 can provide the field information to an email handler 122 for further processing. The e-mail handler 122 can be implemented in a server 120 or can be implemented in the network gateway 106. The e-mail handler 122 can perform various functions, such as checking for compliance, performing data leakage prevention (DLP), archiving, or the like.

The webmail monitor service 118 provides for improved interception and analysis of webmail messages as compared to techniques that rely on monitoring for webmail on a case-by-case basis. That is, some techniques for monitoring webmail can involve specifically designing several different applications hard-coded for each of several different webmail providers (e.g., one application for monitoring GMAIL, one application for monitoring HOTMAIL, etc.). Such hard-coded applications, however, are costly and require significant resources for designing and programming. Moreover, such hard-coded programs need to be produced each time a new webmail provider begins providing webmail service. The webmail monitor service 118 can detect webmail messages regardless of the webmail provider and is not hard-coded for any one particular webmail provider.

Figure 3:
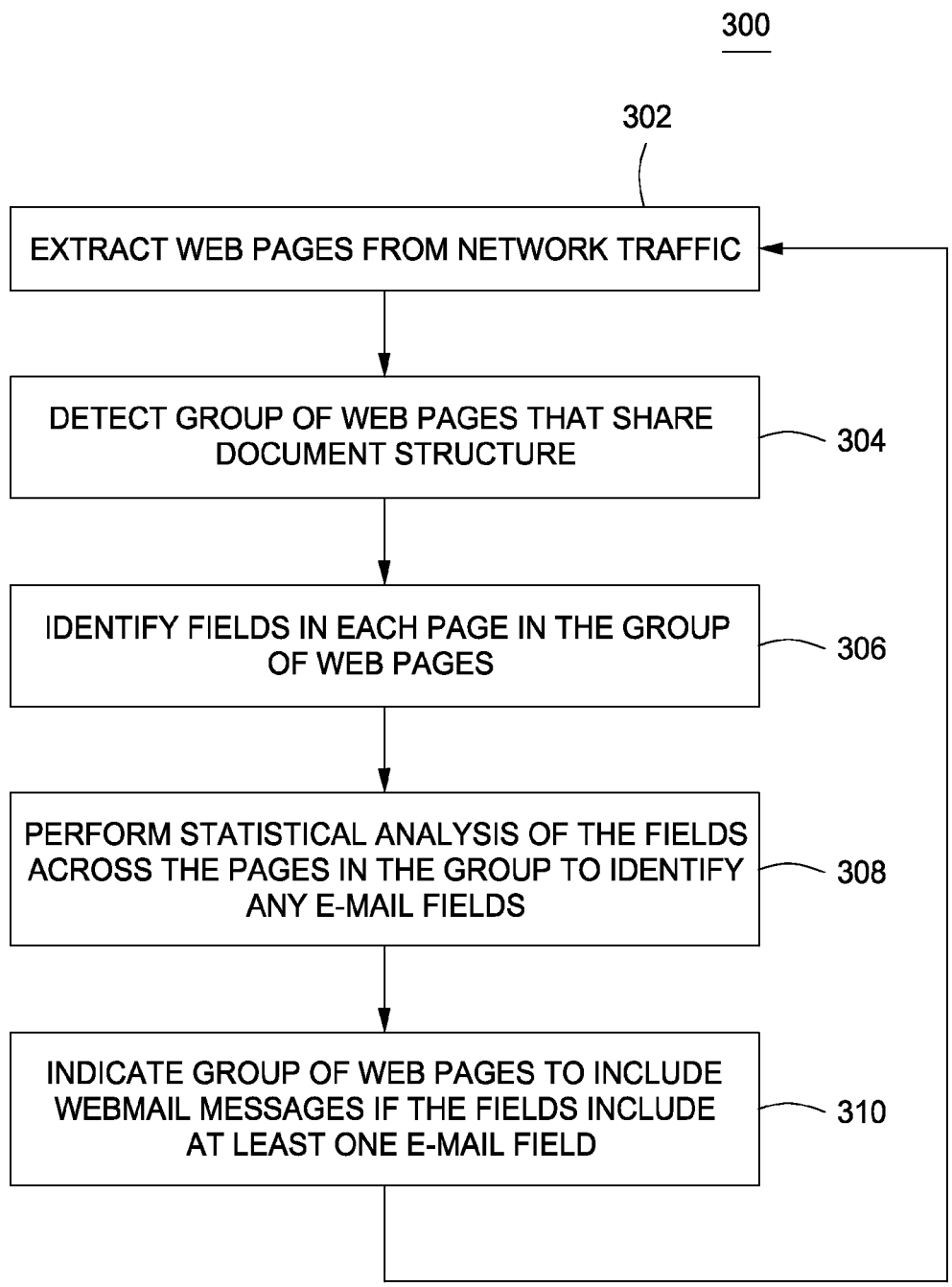
FIG. 3 is a flow diagram depicting a method of processing network traffic according to some embodiments of the invention.

FIG. 3 is a flow diagram depicting a method 300 of processing network traffic according to some embodiments of the invention. The method 300 begins at step 302, where web pages are extracted from the network traffic. At step 304, a group of the web pages is detected that share a document structure. At step 306, fields in each page in the group of web pages are identified. At step 308, a statistical analysis of the fields of each page in the group of web pages is performed to identify any e-mail fields. At step 310, the group of web pages is indicated to include webmail messages if the fields of each page in the group of web pages include at least one e-mail field. The method 300 may return to step 304 and repeat for additional groups of web pages in the network traffic.

Returning to FIG. 2, an exemplary embodiment of the structure extraction algorithm performed by the structure extractor 208 is now described. The input to the structure extraction algorithm is a group of web pages that share a document structure. The structure extraction algorithm is tasked to: (i) separate each page in the group into structural portions; (ii) determine which of the structural portions are common across all pages in the group (and hence are part of the underlying shared document structure); and (iii) determine which of the structural portions are fields that can have different values across different pages. In one embodiment, the structure extraction algorithm begins by selecting two pages from the group and identifying text that is common to both pages. For example, a Longest Common Sub-sequence (LCS) can be employed to detect the common text. The common text will include both text that is really common to all pages in the web group, as well as some text that appears common due to coincidence. Then, a third page from the group is selected and the process repeated to further refine the common text. In most cases, the common text will be reduced given the third page with respect to the common text of just the first two pages (i.e., the coincidental common text is reduced). Additional documents can be selected until the common text does not change (i.e. all coincidental common text is removed). This final version of the common text represents the shared document structure of the group of web pages. Any given page in the group includes this common text other text that varies from page to page. These variable text structural portions are designated as fields.

Figure 4:
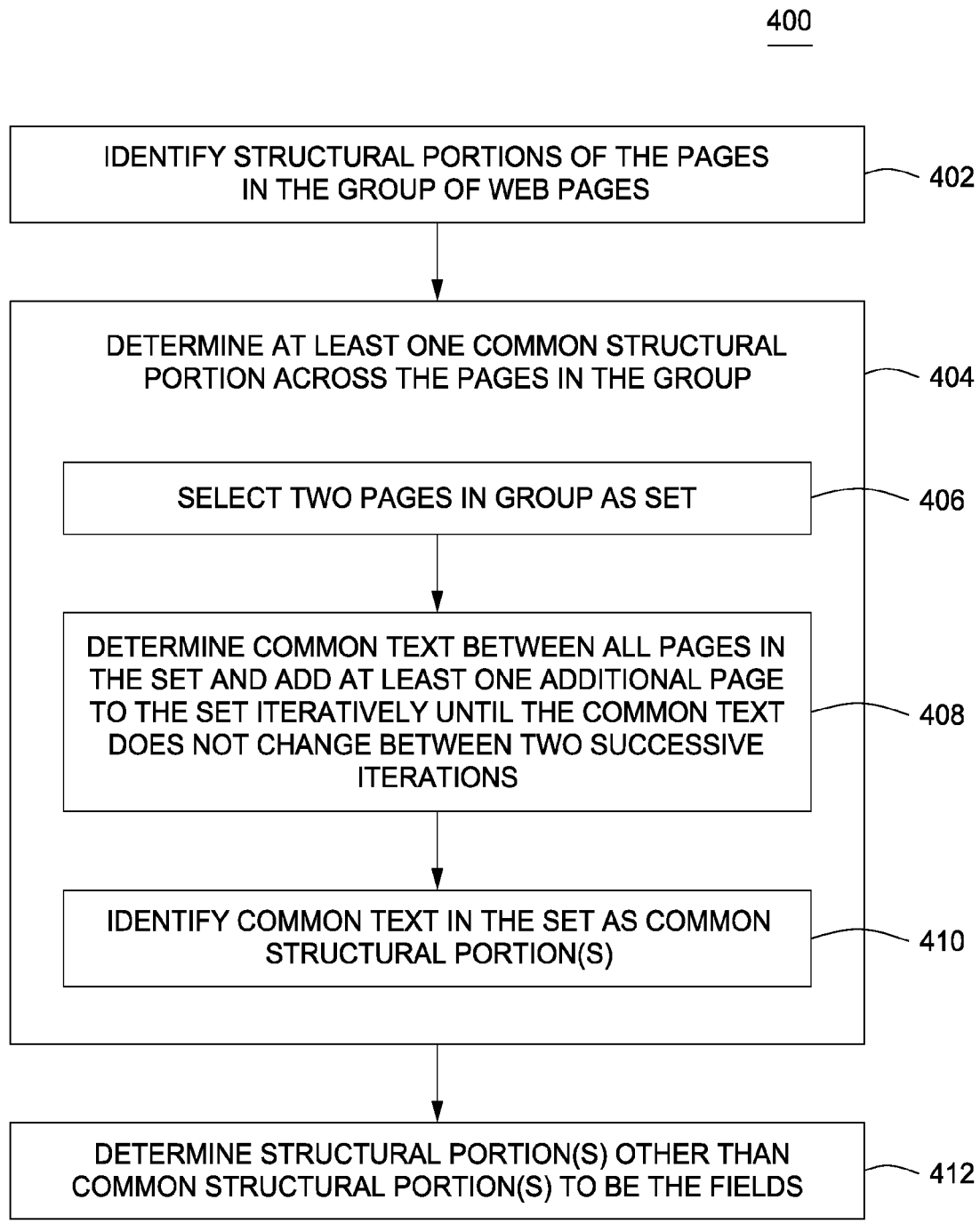
FIG. 4 is a flow diagram depicting a method for determining common structure among a group of web pages according to some embodiments of the invention.

FIG. 4 is a flow diagram depicting a method 400 for determining common structure among a group of web pages according to some embodiments of the invention. The method 400 may be executed as part of the structure extraction algorithm described above. The method 400 begins at step 402, where structural portions of the pages in the group of web pages are identified. At step 404, at least one common structural portion is determined across the pages in the group of web pages. The common structural portion(s) is/are shared across all pages in the group and effectively comprise the shared document structure of the group.

In some embodiments, the step 404 is performed as follows: At step 406, two pages in the group are selected as a set. At step 408, common text between all pages in the set is determined, and at least one additional page is added to the set, iteratively until the common text does not change between two successive iterations. At step 410, the common text between all pages in the set is identified as the common structural potion(s).

Returning to the method 400, at step 412, the structural portion(s) other than the common structural portion(s) is/are determined to be the fields. The method 400 may be repeated for each group of web pages processed by the structure extractor 208.

FIG. 5 depicts an exemplary snippet of HTML code 500 according to some embodiments of the invention. The code 500 illustrates structural portions of an HTML page. In particular, the non-underlined portions of the code 500 illustrate common structural portions. For example, the structural portion <table class="messageheader" border="0" cellpadding="0" cellspacing="0" width="100%"> is a common structural portion. The underlined portions of the code 500 illustrate variable structural portions or fields. For example, the text "The sale ad" may only appear in this particular code 500 and is thus a field of interest.

Returning to FIG. 2, an exemplary embodiment of the field identification algorithm performed by the field identifier 210 is now described. The input to the field identification algorithm is a group of web pages sharing a documents structure. In addition, fields within each of the web pages in the group have been identified. However, at this stage, no specific meaning has been attributed to any of the fields. The field identification algorithm is tasked to identify which of the fields are e-mail fields, if any. In some embodiments, the field identification algorithm selects a field and statistically analyzes the field across all pages in a group of web pages against: (i) at least one statistical requirement; and/or (ii) at least one regular expression requirement.

For example, a selected field in a group of web pages may be deemed a "FROM" e-mail field if and only if the following conditions hold: (1) the field is non-empty in more than a predefined percentage of the pages in the group; and (2) the field contains just a single e-mail address in a predefined percentage of the pages. If the first selected field does not satisfy these statistical requirement(s), then the next field is selected and the process repeated. If the "FROM" field is not found, the field identification algorithm may determine that the present group of web pages do not include webmail messages.

Additional e-mail fields may be detected in a similar fashion. For example, a selected field in a group of web pages may be deemed a "TO" e-mail field if an only if the following conditions hold: (1) the field is present in more than a predefined percentage of the pages in the group; (2) the field matches a regular expression defining an e-mail address list; and (3) the field includes more than one e-mail address in more than a predefined percentage of the pages. A selected field in a group of web pages may be deemed a "CC" e-mail field if an only if the following conditions hold: (1) the field is present in less than a predefined percentage of the pages; and (2) the field matches a regular expression defining an e-mail address list. A selected field in a group of web pages may be deemed a "SUBJECT" e-mail field if an only if the following conditions hold: (1) the field is a text field with size less than a predefined number of characters in a predefined percentage of the documents; and (2) the field does not match the criteria of the "FROM", "TO", and "CC" e-mail fields. A selected field in a group of web pages may be deemed a "BODY" e-mail field if an only if the following conditions hold: (1) the field is a text field with size more than a predefined number of characters in a predefined percentage of the pages; and (2) the standard deviation of the size of the text in the field is more than a predefined value.

Those skilled in the art will appreciate that other types of e-mail fields may be detected similarly (e.g., "BCC" field, etc.). In addition, the statistical and regular expression requirements described above are exemplary and the e-mail fields may be detected using additional and/or different statistical/regular express requirements. The field identification algorithm may indicate a particular group of web pages to include webmail messages if one or more of the e-mail fields has been detected.

Figure 6:
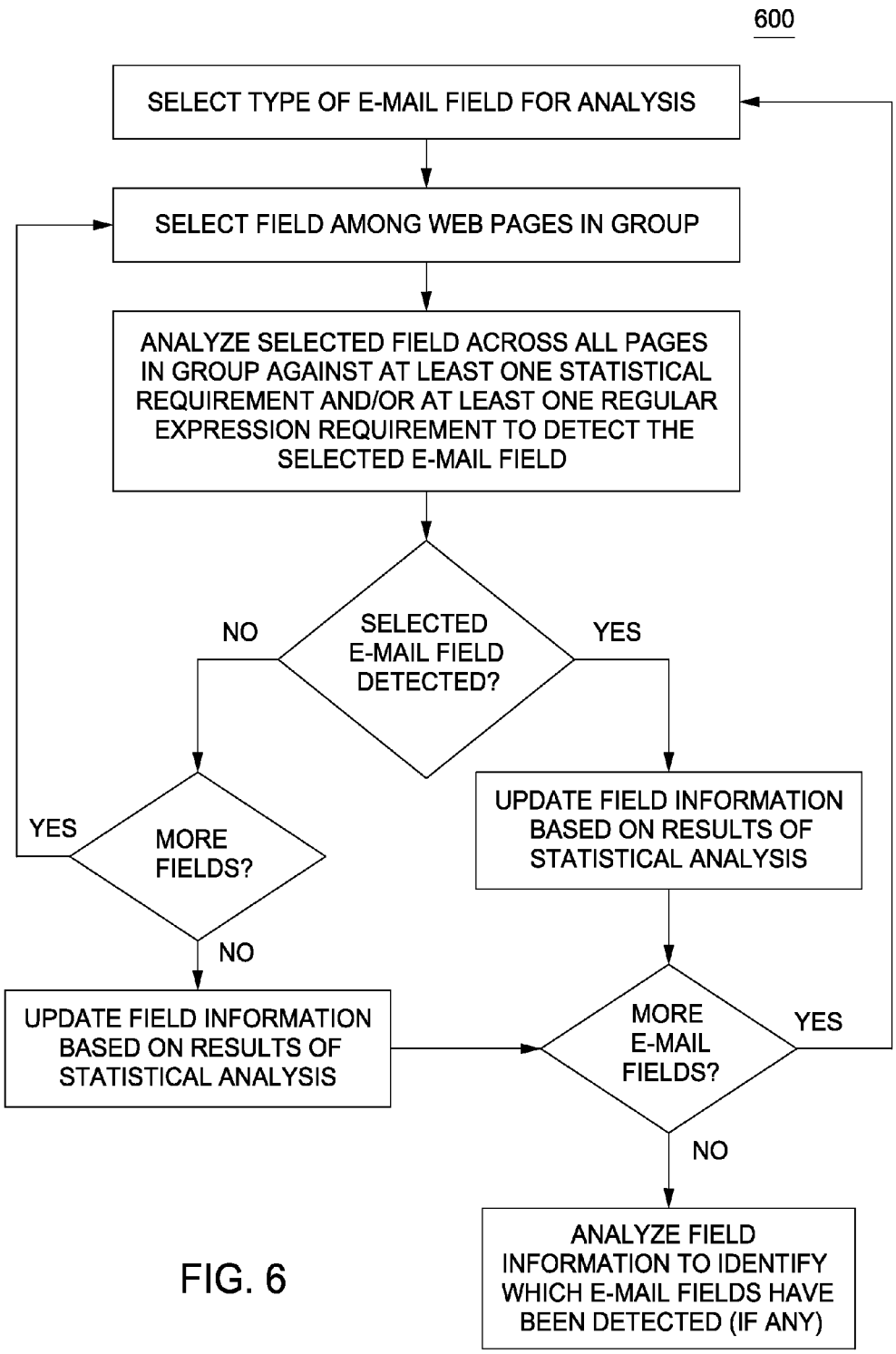
FIG. 6 is a flow diagram depicting a method for identifying fields in a group of web pages as e-mail fields according to some embodiments of the invention.

FIG. 6 is a flow diagram depicting a method 600 for identifying fields in a group of web pages as e-mail fields according to some embodiments of the invention. The method 600 may be performed by the field identifier 210. The method 600 begins at step 602, where a type of e-mail field is selected for detection. At step 604, a field is selected among the web pages in the group. At step 606, the selected field is analyzed across all of the pages in the group against at least one statistical requirement and/or at least one regular expression requirement to detect the selected e-mail field. At step 608, a determination is made whether the selected e-mail field has been detected. If so, the method 600 proceeds to step 610, where field information is updated based on the results of the statistical analysis. At step 611, a determination is made whether there are more e-mail fields to detect. If so, the method 600 then returns to step 602 and repeats for another e-mail field. Otherwise, the method proceeds to step 650.

If at step 608 the selected e-mail field has not been detected, the method 600 proceeds to step 612. At step 612, a determination is made whether there are more fields to check. If so, the method returns to step 604 and repeats for another field. If there are no more fields to check at step 612, the method 600 proceeds to step 614, where field information is updated based on the results of the statistical analysis. The method then proceeds to step 611. At step 650, the field information is analyzed to identify which e-mail fields have been detected (if any). The group of web pages may be indicated as including webmail messages if one or more of the e-mail fields have been detected.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of processing network traffic, comprising:
extracting web pages from network traffic;
identifying fields in each page of a group of the web pages that share a document structure, wherein the step of identifying comprises:
executing a document clustering algorithm using the web pages as parametric input to establish the group of web pages;
executing a structure extraction algorithm configured to:
identify structural portions of the pages in the group of web pages;
determine at least one common structural portion in the structural portions as being shared across all pages in the group of web pages, the at least one common structural portion comprising the document structure; and
determine each of the structural portions other than the at least one structural portion to be the fields;
performing a statistical analysis of the fields of each page in the group of web pages to identify any electronic mail (e-mail) fields; and
indicating the group of web pages to include web-based e-mail messages if the fields of each page in the group of web pages include at least one e-mail field.

2. The method of claim 1, wherein the step of determining the at least one common structural portion comprises:
selecting two pages of the group of web pages as a set;
iteratively determining common text between all pages in the set and adding at least one additional page of the group of web pages to the set until the common text does not change between two successive iterations; and
identifying the common text between all pages in the set as the at least one common structural portion.

3. The method of claim 1, wherein the step of performing the statistical analysis comprises:
analyzing each of the fields across all of the pages in the group of web pages against at least one statistical requirement.

4. The method of claim 3, wherein the step of performing the statistical analysis further comprises:
analyzing at least one of the fields across all of the pages in the group of web pages against at least one regular expression requirement.

5. The method of claim 1, further comprising:
extracting text content from the fields of each page in the group of web pages if the group of web pages is indicated as including web-based e-mail messages.

6. An apparatus for processing network traffic, comprising:
one or more computer processors communicatively coupled to a network wherein the one or more computer processors are configured to:
extract web pages from the network traffic;
identify fields in each page of a group of the web pages that share a document structure, wherein the step of identifying comprises:
executing a document clustering algorithm using the web pages as parametric input to establish the group of web pages;
executing a structure extraction algorithm configured to:
identify structural portions of the pages in the group of web pages;
determine at least one common structural portion in the structural portions as being shared across all pages in the group of web pages, the at least one common structural portion comprising the document structure; and
determine each of the structural portions other than the at least one structural portion to be the fields;
perform a statistical analysis of the fields of each page in the group of web pages to identify any electronic mail (e-mail) fields; and
indicat the group of web pages to include web-based e-mail messages if the fields of each page in the group of web pages include at least one e-mail field.

7. The apparatus of claim 6, wherein the determining the at least one common structural portion comprises:
selecting two pages of the group of web pages as a set;
iteratively determining common text between all pages in the set and adding at least one additional page of the group of web pages to the set until the common text does not change between two successive iterations; and
identifying the common text between all pages in the set as the at least one common structural portion.

8. The apparatus of claim 6, wherein the one or more computer processors configured to perform the statistical analysis comprises:
analyzing each of the fields across all of the pages in the group of web pages against at least one statistical requirement.

9. The apparatus of claim 8, wherein the one or more computer processors configured to perform the statistical analysis further comprises:
analyzing at least one of the fields across all of the pages in the group of web pages against at least one regular expression requirement.

10. The apparatus of claim 6, wherein the one or more computer processors are configured to:
extract text content from the fields of each page in the group of web pages if the group of web pages is indicated as including web-based e-mail messages.

11. A computer readable medium having instructions stored thereon that when executed by a processor cause the processor to perform a method of processing network traffic, comprising:
extracting web pages from the network traffic;
identifying fields in each page of a group of the web pages that share a document structure, wherein the step of identifying comprises:
executing a document clustering algorithm using the web pages as parametric input to establish the group of web pages;
executing a structure extraction algorithm configured to:
identify structural portions of the pages in the group of web pages;
determine at least one common structural portion in the structural portions as being shared across all pages in the group of web pages, the at least one common structural portion comprising the document structure; and
determine each of the structural portions other than the at least one structural portion to be the fields;

performing a statistical analysis of the fields of each page in the group of web pages to identify any electronic mail (e-mail) fields; and indicating the group of web pages to include web-based e-mail messages if the fields of each page in the group of web pages include at least one e-mail field.

12. The computer readable medium of claim 11, wherein the step of determining the at least one common structural portion comprises:

selecting two pages of the group of web pages as a set;

iteratively determining common text between all pages in the set and adding at least one additional page of the group of web pages to the set until the common text does not change between two successive iterations; and identifying the common text between all pages in the set as the at least one common structural portion.

13. The computer readable medium of claim 11, wherein the step of performing the statistical analysis comprises:

analyzing each of the fields across all of the pages in the group of web pages against at least one statistical requirement.

14. The computer readable medium of claim 13, wherein the step of performing the statistical analysis further comprises:

analyzing at least one of the fields across all of the pages in the group of web pages against at least one regular expression requirement.

\* \* \* \* \*